US008797543B2

(12) United States Patent
Hall

(10) Patent No.: US 8,797,543 B2
(45) Date of Patent: Aug. 5, 2014

(54) COHERENT AND NON-COHERENT INTERFEROMETRY WITH COLD MIRROR FOR CONTACT LENS THICKNESS MEASUREMENT

(75) Inventor: William Jordan Hall, Atlanta, GA (US)

(73) Assignee: Novartis AG, Basel (CH)

( * ) Notice: Subject to any disclaimer, the term of this patent is extended or adjusted under 35 U.S.C. 154(b) by 848 days.

(21) Appl. No.: 12/456,840

(22) Filed: Jun. 23, 2009

(65) Prior Publication Data

US 2009/0262333 A1   Oct. 22, 2009

Related U.S. Application Data

(63) Continuation of application No. 11/471,921, filed on Jun. 21, 2006.

(60) Provisional application No. 60/695,653, filed on Jun. 30, 2005.

(51) Int. Cl.
*G01B 9/02* (2006.01)
(52) U.S. Cl.
USPC .......................................... 356/497; 356/504
(58) Field of Classification Search
USPC ................... 356/51, 497, 503, 124, 127, 632
See application file for complete search history.

(56) References Cited

U.S. PATENT DOCUMENTS

| 5,443,152 | A | * | 8/1995 | Davis .............................. 206/5.1 |
| 5,596,409 | A |  | 1/1997 | Marcus et al. ................. 356/357 |
| 5,673,110 | A | * | 9/1997 | Erickson et al. .............. 356/507 |
| 6,034,772 | A | * | 3/2000 | Marcus et al. ................. 356/503 |
| 6,259,518 | B1 | * | 7/2001 | Russell et al. ................. 356/124 |
| 6,690,473 | B1 | * | 2/2004 | Stanke et al. ................. 356/601 |
| 6,829,054 | B2 |  | 12/2004 | Stanke et al. ................. 356/601 |
| 2002/0085208 | A1 |  | 7/2002 | Hauger et al. ................. 364/479 |
| 2004/0189981 | A1 |  | 9/2004 | Ross, III et al. ............... 356/124 |

FOREIGN PATENT DOCUMENTS

JP         56160631        12/1980

OTHER PUBLICATIONS

"Practical Applications in Film and Optics Measurements for Dual Light Source Interferometry", Todd Blalock, Steve Heveron-Smith, Lumetrics, Inc., Copyright 2004 Society of Photo-Optical Instrumentation Engineers, 7 Pages.

* cited by examiner

*Primary Examiner* — Hwa Lee
(74) *Attorney, Agent, or Firm* — Robert Ambrose

(57) ABSTRACT

This invention relates to an apparatus for measuring a sample contact lens. In particular, the present invention has a housing to hold a sample contact lens to be measured, one or more movement stages connected to the housing, and an interferometer.

5 Claims, 3 Drawing Sheets

COHERENT AND NON-COHERENT INTERFEROMETRY WITH COLD MIRROR FOR CONTACT LENS THICKNESS MEASUREMENT

This application is a continuation of U.S. patent application Ser. No. 11/471,921, filed Jun. 21, 2006, which claims the benefits under 35 U.S.C. §119(e) of the U.S. Provisional Patent Application No. 60/695,396 filed Jun. 30, 2005, each of which is herein incorporated by reference in its entirety.

FIELD OF THE INVENTION

This invention relates to an apparatus and method for measuring the thickness of mold components during a manufacturing process. In particular, the present invention uses fiber optic interferometry to measure the center thickness of ophthalmic lenses.

BACKGROUND OF THE INVENTION

Ophthalmic lenses may be created using a variety of methods, one of which includes molding. In a double sided molding process, the lenses are manufactured between two molds without subsequent machining of the surfaces or edges. Such mold processes are described, for example in U.S. Pat. No. 6,113,817, which is expressly incorporated by reference as if fully set forth herein. As such, the geometry of the lens is determined by the geometry of the mold. Typical molding systems include cast molding, which involves using two mold halves, and spin-casting. These methods may also be combined with other machining techniques to create specific lens designs. Another process involves cycling lenses through a series of stations on a semi-continuous basis. The cyclic portion of lens production generally involves dispensing a liquid crosslinkable and/or polymerizable material into a female mold half, mating a male mold half to the female mold half, irradiating to crosslink and/or polymerize, separating the mold halves and removing the lens, packaging the lens, cleaning the mold halves and returning the mold halves to the dispensing position. Once a mold is designed and fabricated it must be measured to ensure that it meets the proper specifications. Typical molds may be spherical or non-spherical, depending upon the type of lens to be created. Because most molds have one or more arcuate surfaces, linear coordinates may be unable to measure a curved surface accurately or may only be able to accurately measure portions of the mold geometry. Additionally, current measurement means such as Michelson interferometers may be adapted for use in a lab but may not be practical or efficient for use on a manufacturing line due to vibration and other types of interference/noise that may affect sensitive equipment.

An interferometer is a measurement instrument that utilizes optical interference to determine various characteristics of optical surfaces. Interferometers typically generate a precise monochromatic wavefront, such as that of a laser, and split it using a beam splitter. The resulting two wavefronts include a test wavefront and a reference wavefront. These wavefronts are passed through a sample and a reference optical system, respectively, to create interference fringes which may then be measured. Methods for measuring the thickness of a material using interferometers are known in the prior art. For example, U.S. Pat. No. 3,319,515 (Flournoy) relates to the determination of thickness on the basis of interferometric optical phase discrimination and is expressly incorporated by reference as if fully set forth herein. U.S. Pat. No. 5,473,432 (Sorin) and U.S. Pat. No. 5,610,716 (Sorin et al) relate to an apparatus and method for measuring film thickness of a moving film, employing optical reflectometry, both of which are expressly incorporated by reference as if fully set forth herein.

SUMMARY OF THE INVENTION

The present invention seeks to provide a non-destructive, non-contact method and apparatus for determining mold thickness.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

The present invention includes a method for determining the thickness of a sample that has one or more boundaries that reflect light. Such a method may include providing one or more interferometers supplied with a coherent light source and a non-coherent light source and positioning the contact lens such that the non-coherent light source is incident upon the sample; and obtaining measurements of the contact lens thickness as generated by interference fringes created by the interferometer. This method is designed to be used on a manufacturing line so that contact lenses or contact lens mold thickness may be determined. In one embodiment of the present invention, the method may also include analyzing the interference fringes. In another embodiment of the present invention, the method may include positioning the sample above the non-coherent light source. The sample may also be positioned below the coherent light source.

In the present invention the one or more interferometers may be fiber-optic interferometers. In an embodiment in which interference fringes are analyzed, the analysis may include calculating distance using optical path and group index. In the positioning step of the present invention, it may be desirable to position the sample lens such that the non-coherent light source is incident upon the sample. In still another embodiment, the positioning step may include placing a probe within about 5 degrees normal to the surface to be measured. Additionally, it may be preferable to have a substantially constant distance between the sensor and the sample. In a related embodiment, the sensor may be aligned over the center of the lens or lens mold prior to the positioning step.

The interference fringes of the present invention may be generated by light reflecting off of the boundaries between: a medium and the lower surface of a female mold; the upper surface of the female mold and the lens material within the assembled mold; the lens material within the assembled mold and the lower surface of a male mold; and the upper surface of the male mold and the medium. In related embodiments medium may be air or saline. The present invention may also include alignment process that aligns the interferometer probe with the center of the sample.

In the obtaining step of the present invention, the obtaining step may include converting an optical path distance to material thickness. Converting the optical path distance may comprise measuring the optical path distance; and dividing the optical path distance by the group index of the material.

The present invention may include an apparatus that is related to the method. This apparatus may include one or more movement stages connected to a lens measurement system; a means for calculation, and a lens measurement system that contains a housing that holds a sample lens, wherein the lens measurement system is connected to the movement stages via a support post. The lens measurement system may include a light source and a fiberoptic interferometer. The apparatus, similar to the method, may include a means for aligning the fiber optic interferometer with the sample lens. In a related embodiment, the means for calculation may include a computer that, in conjunction with the interferometer, is capable of determining the group index of a material.

DETAILED DESCRIPTION OF THE INVENTION

Figure 1:
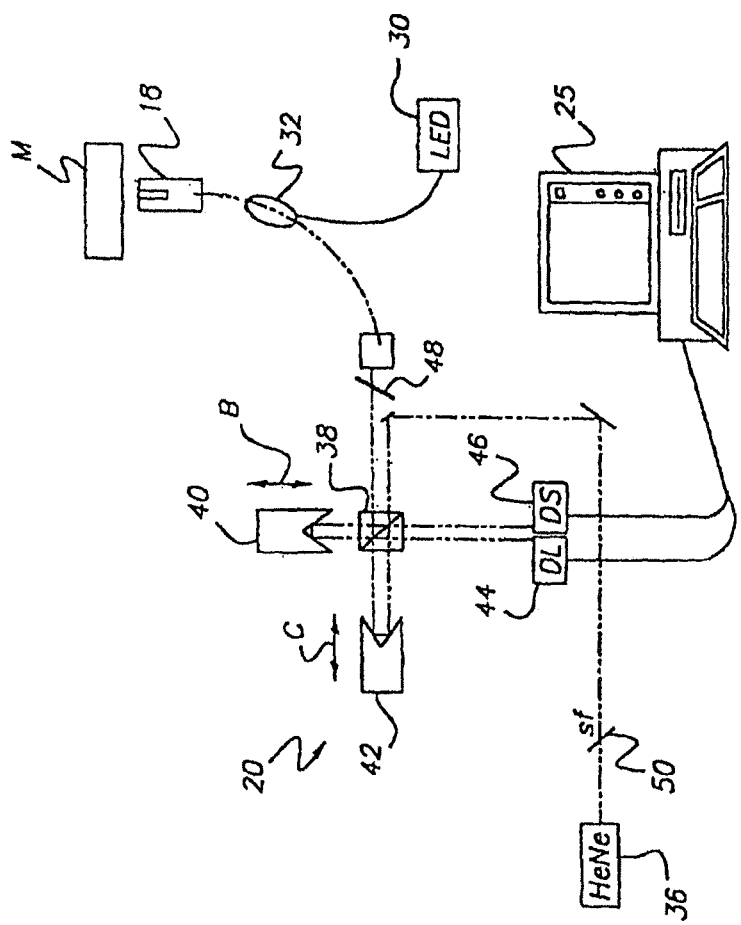
FIG. 1 depicts a typical Michelson interferometer.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. In particular, the terms male mold and male mold half may be used interchangeably. The terms female mold and female mold half may also be used interchangeably. Additionally the term "sample" refers to a lens sample and/or a mold sample. It is to be understood by one of ordinary skill in the art that the present discussion is a description of exemplary embodiments only, and is not intended as limiting the broader aspects of the present invention.

The present invention comprises an apparatus and method to more accurately measure the thickness of a mold assembly (an assembled male and female mold). In a preferred embodiment, the present invention is able to measure the center thickness (CT) of the male mold, the female mold, and/or the polymer between the molds. The invention comprises a fiber optic sensor and related methods and fixtures for orienting the fiber optic sensor normal to the surfaces of interest.

The present invention uses the principle that light incident on a translucent or semi-translucent film reflects a portion of that light. If there are multiple surfaces, each surface interface (boundary) will cause some amount to be reflected, dependant upon material properties. For example, a female mold will have two reflections—one from the lower surface and one from the upper surface (the surface that contacts the polymer). It is important to remember, however, that the light is not reflecting from the surface, but rather the boundary between two areas with a change in refractive index of over about 0.01. In an assembled mold, with or without polymer, there will be four reflections: one from the lower surface of the female mold half (the boundary between the air and the lower surface of the female mold half, one from the upper surface of the female mold half (the boundary between the upper surface of the female mold half and the material within the assembled mold), one from the lower surface of the male mold half (the boundary between the material within the assembled mold and the lower surface of the male mold half) and one from the upper surface of the male mold half (the boundary between the upper surface of the male mold half and the air). The reflections measure the thickness of the mold assemblies based upon the optical distance that the reflections have traveled. It is believed that because the sensor is fiber optics-based, it is not easily affected by vibration. Hence, the present invention uses the above fiber optic interferometer technology in conjunction with specific fixturing and manufacturing methods to reduce manufacturing noise that affects the accuracy of interferometric measurement.

A complete description of the fiber optic sensor technology is described in U.S. Pat. Nos. 6,038,027; 6,067,161; 5,596,409; and 5,659,392, all of which are incorporated by reference as if fully set forth herein. A representative system that uses these principles is made by Lumetrics, Inc. (West Henrietta, N.Y.). In accordance with the present invention, a fiber optic interferometer may be used to determine the thickness of a contact lens or associated molds.

An exemplary interferometer apparatus 20 is preferably a dual interferometer apparatus of a Michelson configuration in an autocorrelation mode, as shown in FIG. 1. Optical probe 18 directs a beam of light from a non-coherent light source 30 (such as light-emitting diode (LED)) toward a sample. Optical probe 18 may include includes a Gradient Index lens (e.g., GRIN). The light is reflected from boundaries, as described later in the present application. In a particular embodiment, the light may be reflected on the front F and back B surfaces of the contact lens and the light signals may be introduced into two arms of interferometer apparatus 20 through an optical coupler 32 and a fiber collimator 34 (shown in FIG. 3). A coherent light source 36 (such as a HeNe laser) emits a beam of light toward a beam splitter 38. Beam splitter 38 divides the beams of light into pairs of light beams directed toward a pair of hollow-cube retroreflectors 40, 42 which are mounted 90 degrees apart and move in perpendicular directions as shown by arrows B and C. The outputs of interferometer apparatus 20 are directed to a pair of detectors 44, 46 for LED 30 and laser 36, respectively. The non-coherent light of LED 30 follows the same light path as the coherent light path of HeNe laser 36, but in reverse time order. A band-pass filter 48 blocks the light from laser 36 being incident on material M. A second filter 50 prevents light from LED 30 from interfering with the light from laser 36. As such, the laser interferometer tracks the distance the optical path has changed, with the laser signal providing data acquisition trigger signals, at constant distance intervals, for collecting interferometric data from the LED interferometer. Therefore, the purpose of the laser interferometer is to track the distance the optical path moves while the LED interferometer is collecting data from the boundaries of the sample.

The above-described system measures the optical path. To convert the optical path distance (OPD) to actual material thickness, the measured OPD must be divided by the group index or group velocity of the material. The group index is a material property, is related to the refractive index, and is described at http://www.mathpages.com/home/kmath210/kmath210.htm. The difference in group index between materials must be approximately larger than 0.01 in order for the instrument to detect the reflection. In an embodiment in which the sample is a lens inside of a mold, the lens polymer would have a different group index than the polypropylene mold halves.

The light used by the sensor may be visible, UV, IR, or any other wavelength of radiation that will reflect off the surfaces of interest. Due to the small tolerance on the angle of reflectance, the sample is preferably substantially normal (about 5 degrees from perpendicular) relative to a light emitting probe (fiber optic interferometer) to pick up the return signal. The probe may act as a lens focusing system that shapes the light from the fiber optic interferometer into a useful form. Additionally, the optics of the interferometer probe will preferably determine the distance of the sample from the light-emitting aperture on the interferometer probe. For example, if points other than those located near the center are to be scanned, the sample or the interferometer probe is preferably moved in a way that keeps the orientation of the interferometer probe and sample constant to within the tolerance of the instrument. Changes in the thickness profile of the sample may further reduce the acceptable angle to receive a signal. In an alternative embodiment, the slim tolerance of the signal acceptance angle may be overcome by providing a plurality of interferometer probe heads to measure specific points of interest on the mold. In this embodiment one interferometer probe may be used for each point. The mold surfaces may be optimized to increase the signal by reducing loses in the transmitted light at the air/mold interface (with an anti-reflection coating), creating an equal thickness mold, or optimizing the curve of the mold and/or the motion of the interferometer probe.

In a specific embodiment the measurement device may be located above or below a contact lens or contact lens mold sample on the manufacturing line. The present invention also allows measurement of a hydrated lens. The measurement device is preferably adapted to measure both the lens height and the center thickness.

Figure 2B:
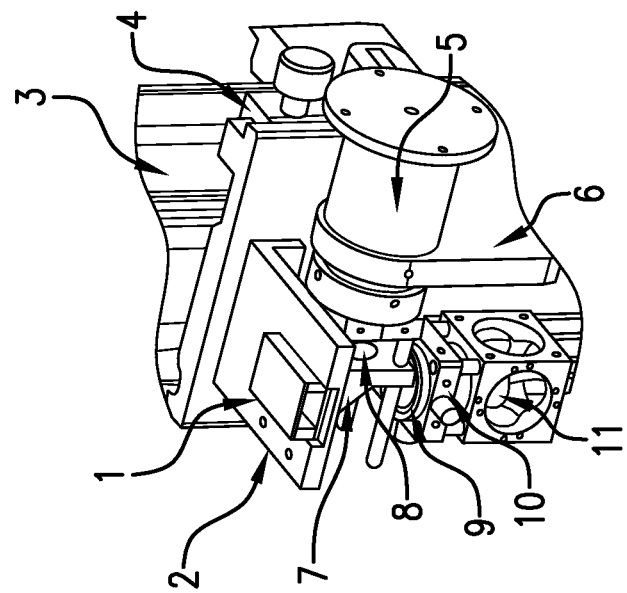
FIG. 2B is a detail drawing of a lens measurement system used in the apparatus of FIG. 2A.
Figure 2A:
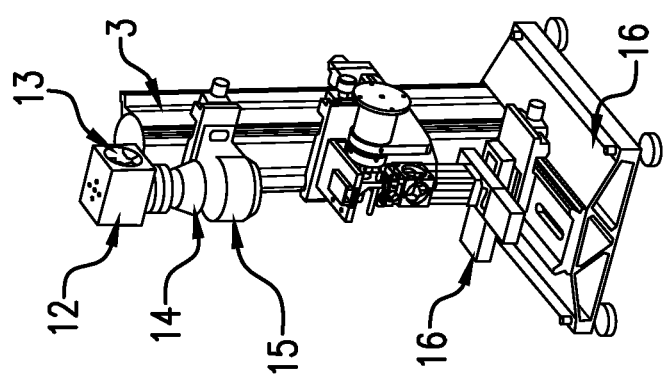
FIG. 2A depicts an apparatus used in one embodiment of the present invention.

An exemplary setup is shown in FIG. 2. Specific manufacturers and models of components of the present invention are exemplary only and are not intended to be limiting. Referring to FIG. 2A, an apparatus of the present invention preferably comprises at least one linear movement stage 16. Stage 16 preferably provides about 25 mm of total travel and is adapted to connect to a controller. In some embodiments, two stages may be used (one for vertical movement and one for horizontal movement). A recommended stage is MFA-CC from Newport and a coordinated controller may be a Newport ESP300 controller. In an embodiment with two stages, the lower stage is preferably a LINOS mounting base with adjustable support feet. The lens measurement system, pictured in FIG. 2B, sits about the linear movement stages and houses the lens, the wetcell 1 that holds the lens, and optical measurement devices and supports. Wetcell 1 preferably has an optically clear top and bottom (for both visible and infrared light). Beneath wetcell 1 is a wetcell support platform 2. The backbone of the lens measurement system is preferably a support post 3, such as, for example a LINOS X95 rail, which is preferably about 500 mm in length. The lens measurement devices or components are attached to support post 3 by a carrier 4 such as a LINOS carrier 50-X95.

Light source 5 is also a component of the lens measurement system. Light source may be a single white LED with a plurality of collimating lenses held in an aluminum cylinder or any optical equivalent. Bracket 6 preferably provides a physical connection between backlight 5 and support post 4. The cold mirror 8 is located preferably about 45 degrees to both the light source 5 and the lens sample. Cold mirror 8 is preferably mounted to wetcell support platform 2 via mounting adapter 7. Cold mirror 8 may be a 31.55 mm mirror, such as LINOS part no. 38-0255-035. Focus lens 9 is used to focus the beam from the interferometer probe. The beam preferably comes through collimator 11 through focusing lens 9. Lens 9 preferably has about a 50 mm focal length. Lens 9 is connected to adjustable mount 10, which allows a user to move the lens in 2 directions +/− about 1 mm. An exemplary mount is made by LINOS, part 06-1025. Fiber optic collimator 11 collimates the beam from the fiber optics cable, which is part of the interferometer Referring back to FIG. 2A, a high resolution camera 12 is preferably located at the top of support post 3. A cooling fan 13 may be located in close proximity to camera 12 to prevent camera 12 from overheating. The present invention may also include a 0.5× telecentric lens 14 for camera 12. Telecentric lens 14 may be mounted via mounting bracket 15. Telecentric lens 14 may be used to measure the diameter of the lens or other sample characteristics to detect the presence of the beam. Telecentric lens 14 may also be used to eliminate optical errors such as parallax.

Figure 3:
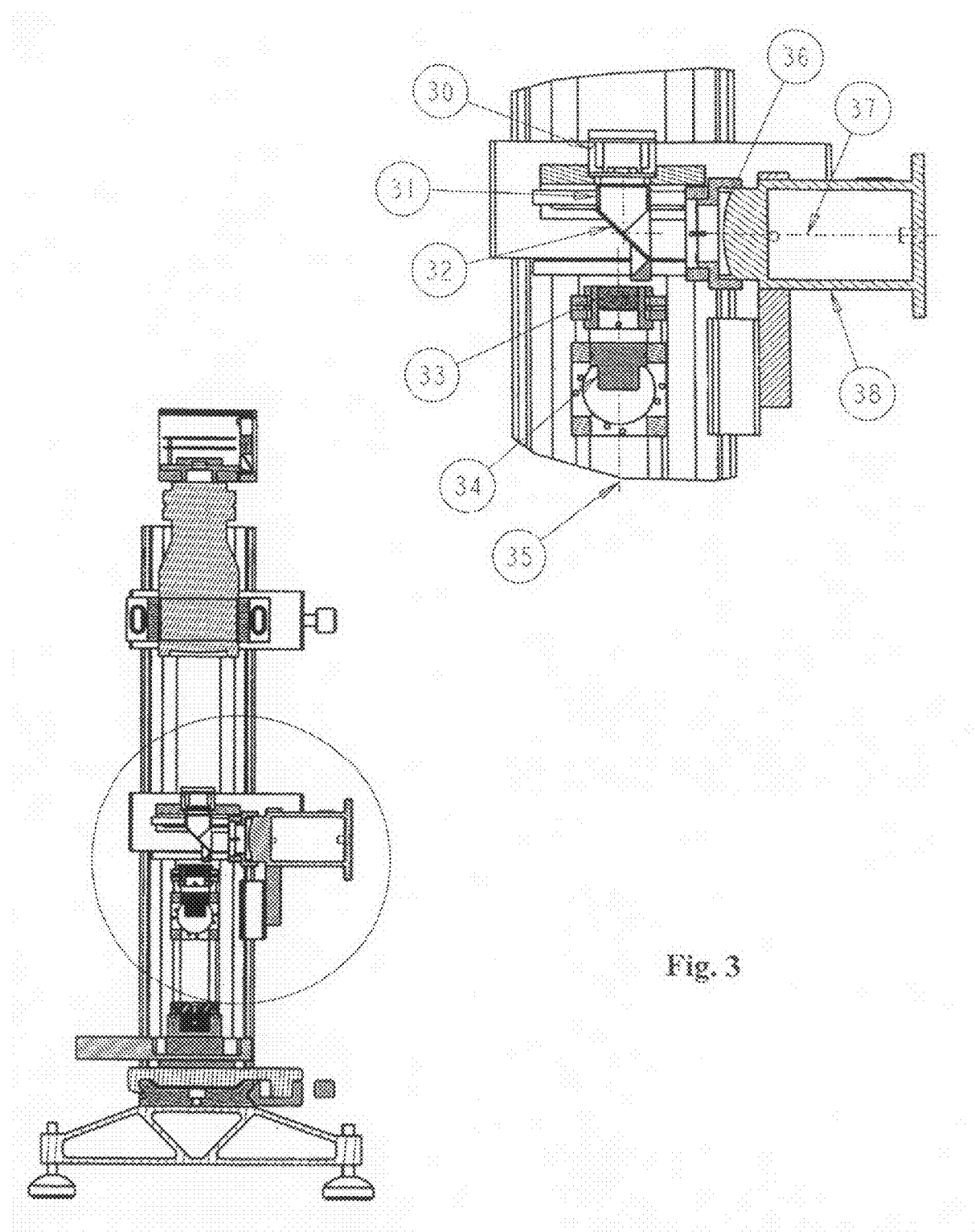
FIG. 3 is a detail drawing of a cold mirror setup that may be used in conjunction with the present invention.

Because the measurement of the lens is limited to surfaces which are nearly normal to the probe, a method is needed to align the interferometer probe with the center of the sample. This is important for accurate CT measurement and guarantees that the read CT value is collected from the center of the lens. One method of aligning the probe with the center of the lens or mold is to view the lens or mold from the top with a digital camera. In this embodiment, shown in FIG. 3, the interferometer probe is inverted and placed under the lens or mold and pointed upward to the sample. The sample in wetcell 30 may be lit by a light source 36 in a way that allows the camera to see and measure the outer diameter and calculate the center of the sample in relation to the camera. An example of a preferred light source is a collimated backlight. This requires a cold mirror, depicted in FIG. 3 as element 32, which reflects visible light but transmits IR. A cold mirror is a special filter that reflects visible light (~350-700 nm) and transmits IR light (~800-2500 nm). It is designed to be used at an angle that exhibits the best transmission/reflection, which may be about 45 degrees. In an embodiment in which a 45 degree angle is used, the backlight and the IR beam are preferably at a 45 deg angle to the cold mirror, as shown in FIG. 3. The cold mirror preferably allows combination of the IR and backlight beams without the losses of a beam splitter. Element 33 is a focusing lens that focuses light.

The backlight 36 is preferably placed perpendicular to the beam 35 and is reflected normal to the sample by the cold mirror 32 which may be mounted approximately 45 degrees to both the light source 36 and the sample. The direction of IR beam 35 preferably remains constant as it passes through cold mirror 32. A computer compares the position of the interferometer probe with the center of the lens or mold. In an embodiment in which the interferometer probe is attached to a motion system, the computer preferably directs the interferometer probe to the center of the lens or mold. An example of a possible motion system is two MFA-CC linear stages (Newport, Inc) mounted in an XY configuration, which may be controlled by an ESP300 Motion Controller/Motion Driver (Newport, Inc). The ESP300 is preferably connected to a PC through an RS-232 cable.

In an embodiment in which a camera is used that is sensitive to 1.3 micron light (IR), the beam from the interferometer probe preferably registers on the camera sensor. An example of this type of camera is a PL-A782 from PixeLink. Using an IR-sensitive camera preferably allows the system to move the interferometer probe to the center of the lens in a closed-loop feedback system. The position of the probe is verified by the position of the beam "dot" from the interferometer probe relative to the calculated sample center.

In a hydrated embodiment, the center thickness (CT) of the lens or mold may be measured directly by the reflected light. For example, in an embodiment in which the sagittal height of the lens is desired, a reference may be used. If the lens is placed in a wetcell that is full of saline, the outer diameter (typically known as the edge flat) of the lens rests on the bottom surface of the wetcell. The light is first reflected from the top and bottom of the wetcell surface, returning a thickness value for the wetcell wall. The next reflecting surface is the bottom of the lens. The difference between the bottom of the lens and the top of the wetcell wall form a thickness which corresponds to the posterior sagittal height (Psag) of the lens. This is critical because the interferometer does not measure distances, only differences in distance (thickness), as previously described. Without a reference, it is not possible to gauge Psag. The next reflecting surface is the top of the contact lens, which provides the CT measurement and the anterior sagittal height (Asag). This is advantageous because base curve equivalent (BCE) calculations rely on the Psag, which is typically derived from the Asag and CT.

$$BCE = -\frac{\left(\left(\frac{Diameter - 2(edgeflat)^2}{4}\right) + Psag^2\right)}{2} / Psag$$

Now, these values can be measured directly removing an additional source of error in the BCE calculation. In addition, the thickness of the wetcell wall should be constant. Any change in the value of the wetcell thickness for the same wetcell would indicate an error in the system. Hence, the original measured wetcell thickness serves as a reference. Additionally, this property can be used to identify individual wetcells. The interferometer is accurate to about 0.1 um in such a situation. The thickness of most wetcells varies significantly more than this value.

As mentioned above, to obtain the actual lens CT in microns, the group index of the lens material must be known. The group index of the material may be a limitation on the accuracy of the instrument because the lens CT is always the measured OPD/group index. However, with the wetcell setup as mentioned above, it is possible to measure the real thickness directly and simultaneously calculate group index for each sample.

In a hydrated embodiment, the procedure first involves calculating the group index (GI) of the saline. This is accomplished by measuring a wetcell in which the gap inside of the cell can be measured by the instrument. Because the GI of air=1, the OPD=real thickness. The wetcell is then filled with saline and the OPD of the gap is measured again. The OPD of the gap will be increased due to the presence of the saline. The GI is equal to the OPD air/OPD saline.

Once the GI of the saline is known, the lens is placed in the cell. There will be three distances measured between the cell walls: the gap below the lens (cell wall to bottom of the lens), lens thickness, and the gap above the lens (top of the lens to the top of the cell). The top and bottom gap are filled with saline, so those thickness can be converted accurately. These two thicknesses can be subtracted from the total wetcell gap without the lens to calculate the lens thickness. This thickness must be divided by the GI of the saline to calculate the real lens thickness. The measured OPD can be divided by this value to calculate the GI for the lens material. This means that the real center thickness measurement is independent of the GI of the lens material. It only depends on an accurate measurement of the GI of the saline. In this calculation, the lens height (PSag) is solely dependent on the GI of the saline since it is equal to the bottom gap.

It is useful to note that the OPD for each layer (cell wall, lens thickness, PSag) is preferably calculated from the reference, not between peaks on the interferometer. For example, the first peak from the interferometer represents the lens CT because this is the smallest thickness. The next peak represents the cell walls since it is the $2^{nd}$ thinnest. The third peak represents the PSag. The OPD for the PSag is OPD from the reference peak all the way to the third peak, rather than the distance between the $2^{nd}$ and $3^{rd}$ peak. For PSag, this total OPD would be divided by the GI of the saline. The lens CT would be the OPD from the reference to the 1st peak, divided by the GI of the lens material, unless the thickness is calculated as described above.

In addition, the optical setup may be changed without affecting the function. The probe and/or camera may be placed either above or below the sample. If the probe is placed above the lens, the PSag is then calculated as the gap "above" the lens. Also, the camera may be placed perpendicular to the cold mirror and the backlight opposite to the camera and probe. Finally, the lens may be lit in other ways such as a ring light, diffuse LED source, or other equivalent lighting techniques. A similar technique may also be used for measuring lens thickness.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

I claim:

1. An apparatus for measuring a sample contact lens, the apparatus comprising:
a housing to hold a sample contact lens to be measured, one or more movement stages coupled to the housing, wherein the two or more movement stages are constrained to linear movement; an interferometer and an interferometer probe having a source of infrared light, a source of visible light oriented at an angle with respect to the interferometer probe, a cold mirror capable of reflecting visible light onto the sample contact lens, the cold mirror further capable of transmitting infrared light to the sample lens, and a camera capable of detecting visible light and infrared light.

2. The apparatus of claim 1 wherein the cold mirror is oriented at an angle of about 45 degrees with respect to source of infrared light and the source of visible light.

3. The apparatus of claim 2 wherein the housing to hold a sample contact lens is a wetcell.

4. The apparatus of claim 1 wherein the one or more movement stages comprises a vertical movement stage and a horizontal movement stage.

5. The apparatus of claim 1 further comprising a computer controlled motion system capable of comparing the position of the interferometer probe with the center of the lens and capable of directing the interferometer probe to the center of the lens.

* * * * *